(12) United States Patent
Yoshida et al.

(10) Patent No.: US 7,395,030 B2
(45) Date of Patent: Jul. 1, 2008

(54) ADAPTIVE CONTROL APPARATUS

(75) Inventors: Makoto Yoshida, Kawasaki (JP); Eizou Ishizu, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 546 days.

(21) Appl. No.: 11/051,642

(22) Filed: Jan. 27, 2005

(65) Prior Publication Data
US 2005/0197071 A1    Sep. 8, 2005

Related U.S. Application Data

(63) Continuation of application No. PCT/JP03/00487, filed on Jan. 21, 2003.

(51) Int. Cl.
H04B 1/00 (2006.01)
(52) U.S. Cl. .................. 455/63.1; 455/463; 455/63.4
(58) Field of Classification Search .......... 455/463.1, 455/63.1, 63.4
See application file for complete search history.

(56) References Cited

U.S. PATENT DOCUMENTS

| 5,778,030 | A | * | 7/1998 | Bruckert et al. ............. 375/317 |
| 6,115,409 | A | * | 9/2000 | Upadhyay et al. ........... 375/144 |
| 6,147,645 | A | | 11/2000 | Yukitomo et al. |
| 7,123,924 | B2 | * | 10/2006 | Cuffaro .................... 455/456.1 |
| 2001/0020918 | A1 | | 9/2001 | Takai |
| 2002/0034967 | A1 | | 3/2002 | Taniguchi et al. |
| 2002/0068613 | A1 | | 6/2002 | Miyano et al. |

FOREIGN PATENT DOCUMENTS

| JP | 10-285104 | 10/1998 |
| JP | 2000-22618 | 1/2000 |
| JP | 2001-169325 | 6/2001 |
| JP | 2001-223516 | 8/2001 |
| JP | 2002-094448 | 3/2002 |
| JP | 2002-118413 | 4/2002 |
| WO | WO 02/45295 | 6/2002 |

* cited by examiner

*Primary Examiner*—Yuwen Pan
(74) *Attorney, Agent, or Firm*—Staas & Halsey LLP (57) ABSTRACT

An adaptive control apparatus that adaptively controls directivity of an array antenna is disclosed. The adaptive control apparatus that can be used by a radio apparatus and a receiver includes a setting unit configured to set up parameters such as the distance between the radio apparatus and the receiver that receives a radio frequency signal transmitted by the radio apparatus, the relative moving speed, and the moving direction of the receiver in reference to the radio apparatus. The adaptive control apparatus further includes an evaluating unit configured to evaluate how much received power at the receiver or the radio apparatus changes after a predetermined period, and a weight control unit configured to adjust two or more weighting factors about two or more antenna elements that constitute the array antenna. The directivity of the array antenna is controlled such that the amount of change of the received power is kept within fixed limits independent of the distance between the receiver and the radio apparatus.

13 Claims, 8 Drawing Sheets

ADAPTIVE CONTROL APPARATUS

CROSS-REFERENCE TO RELATED APPLICATION

This application is a U.S. continuation application filed under 35 USC 111(a) claiming benefit under 35 USC 120 and 365(c) of PCT International Application No. PCT/JP03/00487 filed on Jan. 21, 2003, which is hereby incorporated herein by reference.

BACKGROUND OF THE INVENTION

1. Technical Field

The present invention generally relates to a technical field of mobile communications, and especially relates to an adaptive control apparatus configured to adaptively control directivity of an array antenna.

2. Background Technology

In the technical field, wherein cellular communications are representative applications, the communication bandwidth is broadening as higher speed, higher quality, and the like, are required. In order to transmit a wide-band radio signal to every corner of a cell, higher power is needed than transmitting a narrow-band signal. However, since the transmitting capacity of a mobile terminal has limitations that are more severe than a radio base station, transmission power cannot be simply increased. On the other hand, if a cell radius is made smaller, although the problem of transmission power is solved, the number of radio base stations that have to be installed in an extensive service area remarkably increases, and this is not a viable solution from viewpoints such as facility investment and system management. The problem cannot be fully solved even if transmission bandwidths of uplinks and downlinks are asymmetrically arranged.

In order to cope with the problem, there is technology for maintaining the size of the cell radius by sharply forming the directivity of an antenna such that a radio wave is unevenly and adaptively distributed in a desired direction. There are two techniques in this technology, one is a beam forming method that adaptively controls a main beam of the antenna to the direction of the desired wave of choice (namely, S of SINR=S/(N+I) is increased), and the other is a null forming method that adaptively controls the null point of the antenna to the direction of an interference wave (namely, I of SINR=S/(N+I) is decreased). In either case, the adaptive control technique estimates an arrival direction (DoA: direction of arrival) of a path, and directs a strong directive beam (a beam of a predetermined narrow width) to the desired direction by sequentially updating two or more weighting factors of two or more antenna elements using convergence algorithms, such as a steepest descent method. The beam width is set up so that the received power at a cell edge is greater than a system design value.

In a communication system that uses a spread spectrum method, transmission power control (TCP) controls the transmission power of a mobile terminal so that the communication quality of a signal received by a radio base station is adjusted to the predetermined level (especially receiving level). Specifically, the transmission power of the mobile terminal is increased or decreased according to the distance between the radio base station and the mobile terminal.

Figure 1A:
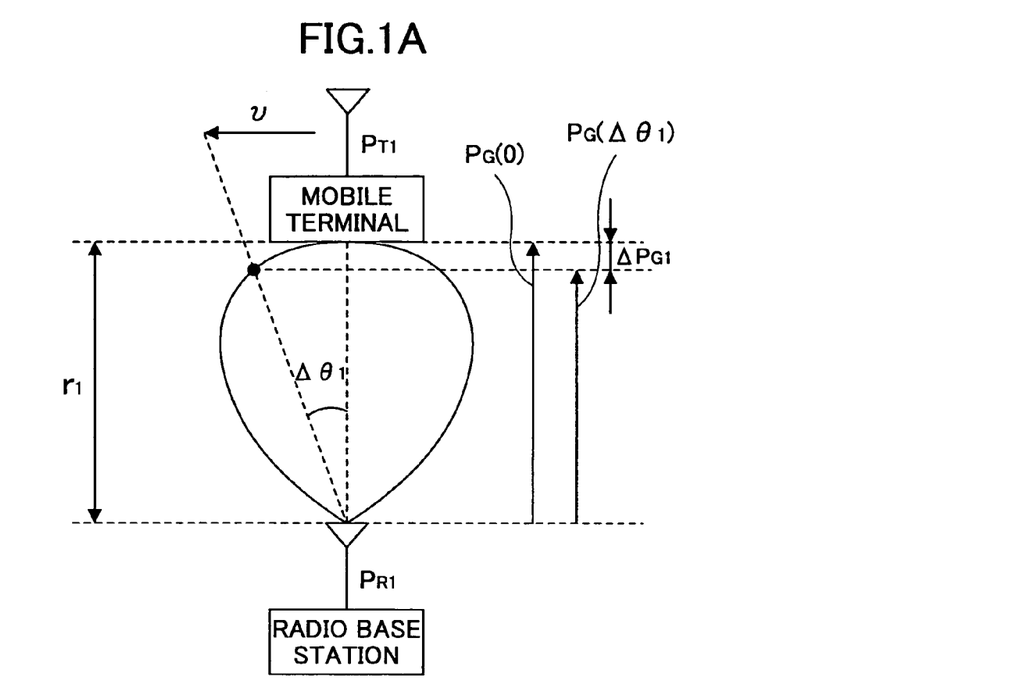
FIGS. 1A and 1B give antenna gain patterns for explaining conventional beam control.
Figure 1B:
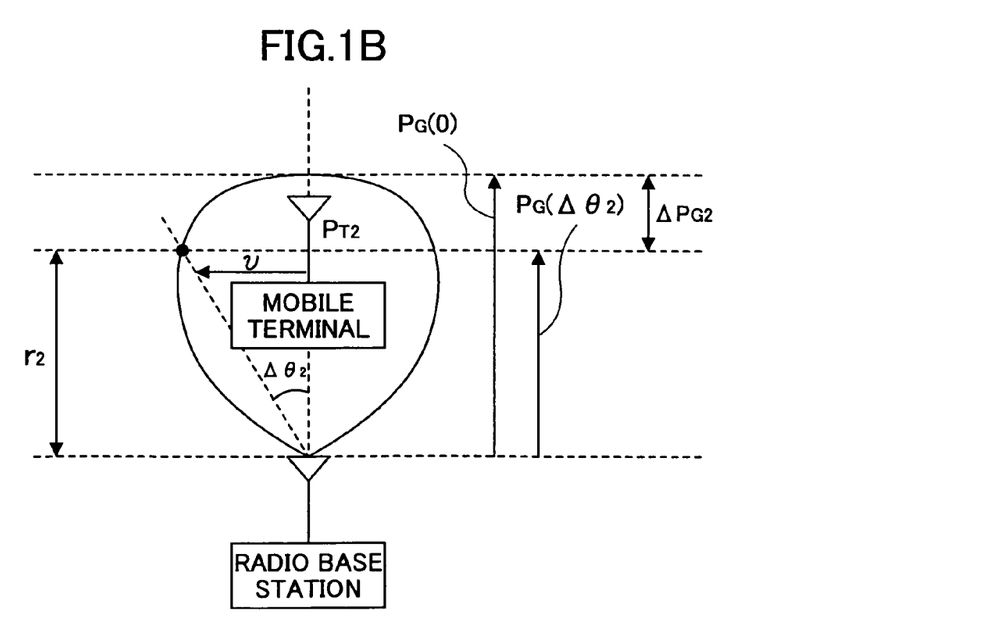

FIGS. 1A and 1B give antenna beam patterns for explaining conventional beam control. In FIG. 1A, the mobile terminal located at a cell edge moves at speed v in a circumferential direction with reference to the radio base station. The mobile terminal transmits at transmission power $PT_1$, and received power $PR_1$ at the radio base station is a function of the transmission power $PT_1$, a beam gain PG, and a distance $r_1$. Angle change per unit time (angular speed) with reference to the radio base station when the mobile terminal moves is expressed by $\Delta\theta_1$, and power gain changes by $\Delta PG_1 = PG(0) - PG(\Delta\theta_1)$. Therefore, the power received by the radio base station after the mobile terminal movement becomes $$PR_1 = PT_1 + PG(\Delta\theta_1) - P_{ATT}(r_1)$$
$$= PT_1 + PG(0) - \Delta PG_1 - P_{ATT}(r_1)$$

Here, $PG(\theta)$ represents a beam gain at a phase angle $\theta$, and $P_{ATT}(r)$ represents an amount of space attenuation of the radio wave corresponding to the distance r.

Further, in FIG. 1B, the case wherein a mobile terminal located near the radio base station moves in a circumferential direction at the speed v relative to the radio base station is shown. The mobile terminal transmits at transmission power $PT_2$, the angle change per unit time (angular speed) with reference to the radio base station is $\Delta\theta_2$, and, the power gain changes by $\Delta PG_2 = PG(0) - PG(\Delta\theta_2)$. Therefore, power received by the radio base station after the mobile station movement becomes $$PR_2 = PT_2 + PG(\Delta\theta_2) - P_{ATT}(r_2)$$
$$= PT_2 + PG(0) - \Delta PG_2 - P_{ATT}(r_2)$$

According to the conventional beam control technique, the beam is formed at a fixed beam width regardless of the distance from the radio base station to mobile terminals, and the beam direction is suitably adjusted. As seen from FIGS. 1A and 1B, for the given same moving speed v and direction (circumferential direction) of the mobile terminals, the angular speed ($\Delta\theta_1$) when the distance to the radio base station is great is smaller than the regular speed ($\Delta\theta_2$) when distance is small, that is $\Delta\theta_1 < \Delta\theta_2$. Accordingly, as for the amounts of power gain change, $\Delta PG_1 < \Delta PG_2$. Correspondingly, as for the power $PR_1$ and $PR_2$ received by the radio base station from the mobile terminals after moving, the received power $PR_1$ from the distant mobile terminal does not become so small (decreased only by $\Delta PG_1$), and the received power $PR_2$ from the nearby mobile terminal becomes very small (decreased by $\Delta PG_2$). For this reason, in order to maintain the level of the signal that the radio base station receives from the mobile terminal that is near and moves, higher transmission power has to be used, or alternatively, the direction of the beam must be adjusted before the angular speed becomes great.

However, since the former conventional technique is to increase the transmission power of the mobile station that is near, interference to other signals occurs, and this is not a desirable technique. According to the latter conventional technique, highly efficient adaptive control that can follow the mobile terminal at a high speed before angular speed becomes large has to be provided in order to adjust the direction of the beam, and the control burden of a system becomes great.

In this connection, Patent Reference 1 (JPA 2002-94448) discloses a technology of performing beam control per group, grouping two or more mobile stations that are close to each other into a group. There, a beam is set such that it covers the area in which the group is located. In this manner, the control burden required of the system and the base station is reduced compared with the case where a beam is controlled per mobile station.

However, grouping as above is not always possible in a communication system, and when grouping is difficult, the desired result cannot be obtained.

Patent Reference 1 JPA 2002-94448

SUMMARY OF THE INVENTION

The present invention aims at offering an adaptive control apparatus that adaptively controls directivity of an array antenna such that each mobile terminal can be continuously followed. This objective is achieved as follows.

The adaptive control apparatus of the present invention is to be used by a radio apparatus that has an array antenna for transmission and reception of a radio frequency signal, wherein the directivity of the array antenna is adaptively adjusted.

The adaptive control apparatus includes a setting unit configured to set up parameters including a distance between the radio apparatus and a receiver that receives the radio frequency signal transmitted from the radio apparatus, a relative moving speed, and a moving direction of the receiver in reference to the radio apparatus, an evaluating unit configured to evaluate how much received power of the receiver or the radio apparatus changes after lapse of a predetermined period, and a weight control unit configured to adjust two or more weighting factors about two or more antenna elements contained in the array antenna, the adaptive control apparatus adjusting the directivity such that the change amount of the received power remains within predetermined limits independent of the distance between the receiver and the radio apparatus.

DESCRIPTION OF THE PREFERRED EMBODIMENTS

In the following, embodiments of the present invention are described with reference to the accompanying drawings.

Figure 2:
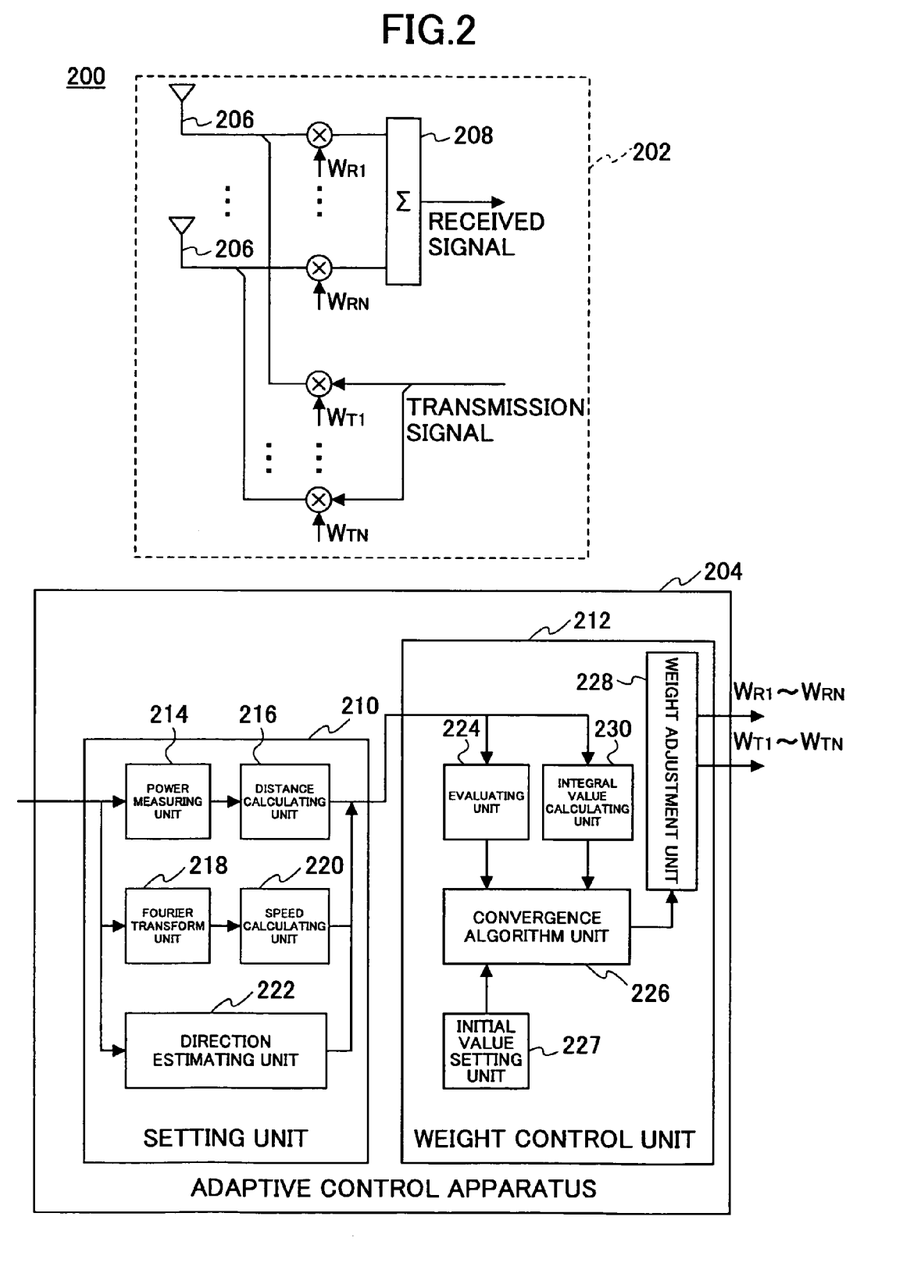
FIG. 2 is a block diagram of an antenna system according to an embodiment of the present invention.

FIG. 2 is a block diagram of an antenna system 200 according to the embodiment of the present invention. In general, the antenna system 200 includes an array antenna 202, and an adaptive control apparatus 204. In the following, the antenna system 200 is explained as belonging to a radio base station; nevertheless, the antenna system 200 is also applicable to a mobile terminal. Further, the control technique of the array antenna explained below is applicable to receiving beam forming and transmitting beam forming.

The array antenna 202 includes N antenna elements 206, and an adder 208 that adds signals from the antenna elements 206. A weighting factor is multiplied to each of the signals received by the antenna elements 206. The adder 208 adds the weighting-factor-multiplied signals, and forms a received signal. Further, in the case of transmission, after a suitable weighting is carried out, a sending signal is transmitted from each antenna element 206. Weighting factors $WR_1$ through $WR_N$ are applied at the time of reception, and weighting factors $WT_1$ through $WT_N$ are applied at the time of transmission. The weighting factors are set up by the adaptive control apparatus 204, are continuously updated for every predetermined updating period, and are controlled to follow a mobile terminal.

The adaptive control apparatus 204 includes a setting unit 210 configured to set up parameters required to calculate the weighting factor based on the received signal either before or after addition by the adder 208, and a weight control unit 212 configured to output the weighting factor based on the parameters. The setting unit 210 includes a power measuring unit 214 configured to calculate power based on the received signal(s) from one or more antenna element(s) 206 before addition, and a distance calculating unit 216 configured to calculate a distance r between the mobile terminal and the radio base station based on the calculated power. The distance calculating unit 216 calculates the distance r based on a known relational expression about the power, for example, $$P_{ATT}(r) = P_0 + \gamma \times 10 \log(r).$$

Here, $P_{ATT}(r)$ represents an amount of space attenuation of the radio wave, $P_0$ represents an amount of space attenuation at a cell edge (end of the cell), and $\gamma$ is a predetermined constant.

Figure 3:
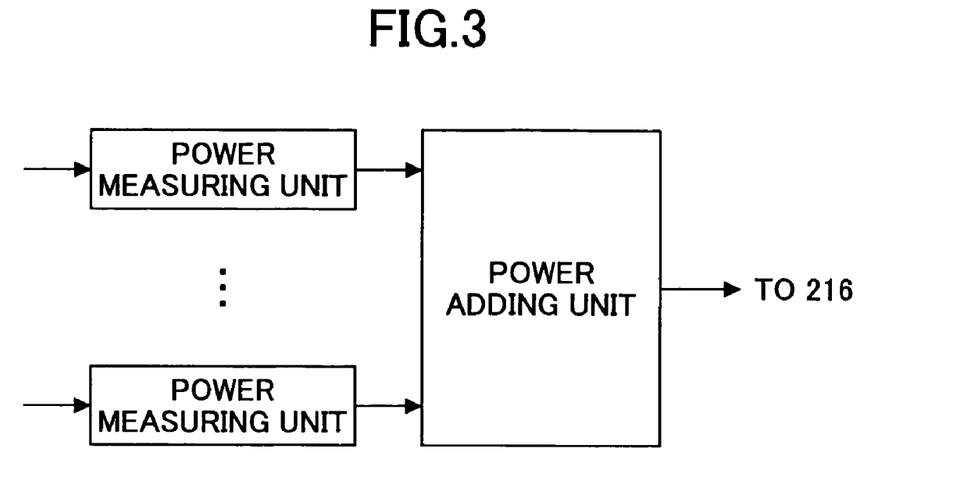
FIG. 3 is a block diagram of a power measuring unit.

The relational expression about the distance is only an example, and it is possible to employ a compensation term as required, and to use another relational expression. Further, a power value used as the foundation of calculating the distance can be obtained based on either the signal from one antenna element 206 before addition, or the signals from two or more antenna elements 206. In the latter case, a power adding unit, such as shown in FIG. 3, that adds and averages the two or more signals is needed. When a compact circuit is desired, the former is desirable. When influence of noise should be suppressed (i.e., raise an S/N ratio), the latter is appropriate. Further, the distance can be obtained without using a known relational expression. For example, coordinates of the mobile terminal can be obtained by GPS, etc., and the distance can be directly calculated based on the coordinates of the mobile terminal and the radio base station. However, it is necessary to provide an apparatus such as a GPS receiver to the mobile terminal, unlike the case where a known relational expression is used.

The setting unit 210 includes a Fourier transform unit 218 configured to obtain a frequency spectrum by carrying out Fourier transform of the signal received by one antenna element 206 before addition or more antenna elements 206, and a speed calculating unit 220 configured to determine a Doppler frequency based on the frequency spectrum, and that calculates a relative speed of the mobile terminal. If the mobile terminal moves in reference to the radio base station, frequency deviation (Doppler shift) arises in the radio wave transmitted and received between the mobile terminal and the radio base station, and the relative speed is calculated based on the following formula.

$$v = f_d \times \lambda = f_d \times c/f_c$$

Figure 4:
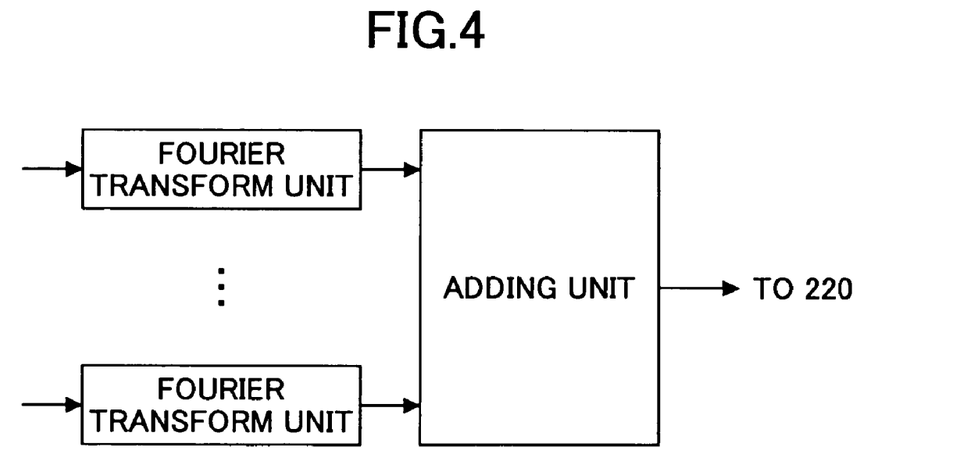
FIG. 4 is a block diagram of a Fourier transform unit.

Here, v represents the relative speed of the mobile terminal, $f_d$ represents the Doppler frequency, $\lambda$ represents the wavelength of the radio wave, c is the speed of light, and $f_c$ represents carrier frequency. The relative speed v can be calculated based on, similar to the distance calculation, either the signal from one antenna element 206 before addition, or the signals from the two or more antenna elements 206. In the latter case, Fourier transform is performed on each signal, and an adding unit is provided, as shown in FIG. 4, in order to add the Fourier transformed signals such that the frequency spectrum is obtained.

The setting unit 210 includes a direction estimating unit 222 configured to obtain a moving direction or angular speed ($\Delta\theta$) of the mobile terminal in reference to the radio base station. The angular speed can be calculated, for example, based on the arrival direction (DoA) of the path from the mobile terminal. Here, as for the power measuring unit 214 and the distance calculating unit 216 for calculating the distance, the Fourier transform unit 218 and the speed calculating unit 220 for calculating the speed, and the direction estimating unit 222, all of these do not always have to be prepared. So long as the parameters such as the distance r, the speed v, and the angular speed $\Delta\theta$ can be provided to the weight control unit 212, these values may be obtained either by these units, or by otherwise input information.

The weight control unit 212 includes an evaluating unit 224 configured to evaluate how much the received power of the mobile terminal changes after lapse of a predetermined period (for example, when the weighting factor is updated next) based on the various parameters provided by the setting unit 210. The weight control unit 212 includes a convergence algorithm unit 226 configured to perform the algorithm for updating the weighting factors based on an evaluation result of the evaluating unit 224. The algorithm employed here uses a steepest descent method like LMS (least mean squares) where a value of an evaluation function varies depending on the weighting factors, and the value is made the greatest or the smallest. For example, the evaluation function is defined by a power value of an error between a received signal and a known signal, and the weighting factors are continuously changed so that the value of the evaluation function is minimized. An initial value generation unit 227 prepares and sets up an initial value for calculation by this algorithm. The weight control unit 212 includes a weight adjustment unit 228 configured to set a weighting factor calculated by the convergence algorithm unit 226 to each antenna element 206. The weight adjustment unit 228 provides a signal that expresses the weighting factor to each antenna element 206, and the weighting factor is actually applied. The weight control unit 212 includes an integral value calculating unit 230 configured to calculate an integral value over a predetermined period of the received power that the mobile terminal receives based on the parameters provided by the setting unit 210.

As described above, the conventional beam control is to turn the beam of the fixed beam width to a desired direction (direction in which the mobile terminal is located) each time. The beam width is set up so that the received power at the cell edge is greater than a system design value. In this case, for example, power change ($\Delta PG_1$) of a signal received by the mobile terminal or the radio base station is small when the mobile terminal located at a far distance from the radio base station, like the cell edge, moves in the circumferential direction at speed v, while power change ($\Delta PG_2$) of a signal received by the mobile terminal or the radio base station is great when the mobile terminal near the radio base station moves in the circumferential direction at the same speed. In contrast, according to the present invention, a narrow beam width is used for the mobile terminal located far from the radio base station, and a wider beam width is used for the mobile terminal located near the radio base station. In this way, the beam continuously follows the mobile terminal regardless of the distance.

Figure 5A:
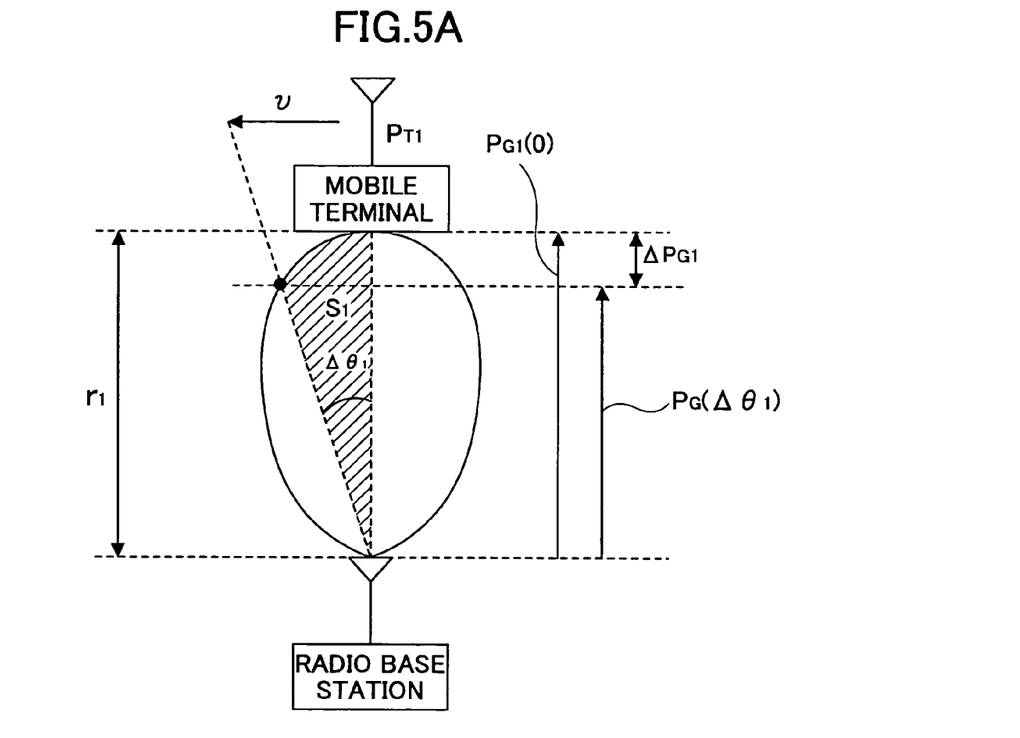
FIGS. 5A and 5B give antenna gain patterns for explaining beam control according to the embodiment of the present invention.
Figure 5B:
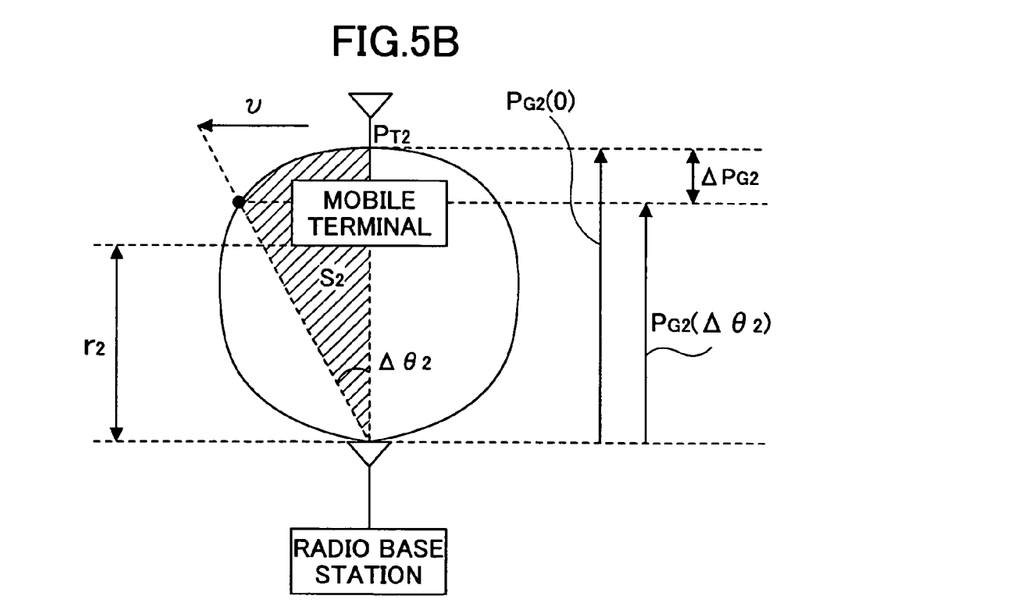

FIGS. 5A and 5B give antenna gain patterns for explaining the beam control according to the embodiment of the present invention. In FIG. 5A, a situation is illustrated wherein the mobile terminal located at the cell edge moves in the circumferential direction at the speed v in reference to the radio base station. Although the mobile terminal is made to move in the circumferential direction in the description, this is for simplifying the explanation, and generality is not lost. The mobile terminal transmits with transmission power $PT_1$, and the received power at the radio base station is $PR_1(PT_1, PG_1, r_1)$. If the mobile terminal moves, the angle change per unit time (angular speed) with reference to the radio base station is $\Delta\theta_1$, and power gain changes by $\Delta PG_1 = PG_1(0) - PG_1(\Delta\theta_1)$. First, power received $PR_1$ by the radio base station before the mobile terminal moves is expressed by $$PR_1 = PT_1 + PG_1(0) - P_{ATT}(r_1) \quad (a)$$

Here, $PG_1(\theta)$ represents the power gain at a phase angle $\theta$, and $P_{ATT}(r)$ expresses the amount of space attenuation of the electric wave corresponding to a distance r. The power received $PR_1$ by the radio base station after the mobile terminal moves is expressed by $$PR_1 = PT_1 + PG_1(\Delta\theta_1) - P_{ATT}(r_1) \quad (b)$$
$$= PT_1 + PG_1(0) - \Delta PG_1 - P_{ATT}(r_1)$$

In FIG. 5B, the situation is that the mobile terminal is located near the radio base station, and moves in the circumferential direction at the same speed v as above with reference to the radio base station. The mobile terminal transmits at the transmission power $PT_2$, the angle change per unit time (angular speed) is set to $\Delta\theta_2$, and the power gain changes by $\Delta PG_2 = PG_2(0) - PG_2(\Delta\theta_2)$. Then, the power received $PR_2$ by the radio base station before the mobile terminal moves is expressed by $$PR_2 = PT_2 + PG_2(0) - P_{ATT}(r_2) \quad (c)$$

The power received $PR_2$ by the radio base station after the mobile terminal moves is expressed by $$PR_2 = PT_2 + PG_2(\Delta\theta_2) - P_{ATT}(r_2) \quad (d)$$
$$= PT_2 + PG_2(0) - \Delta PG_2 - P_{ATT}(r_2)$$

According to the present invention, control is carried out so that the received power becomes equal regardless of the distance. Specifically, control is performed so that $PR_1$ and $PR_2$ are equal. It should be noted that the power gains $PG_1$ and $PG_2$ are not necessarily equal according to the present invention, which is different from the conventional practice. In order to satisfy $PR_1 = PR_2$ before the mobile terminal movement, $$PT_1 + PG_1(0) - P_{ATT}(r_1) = PT_2 + PG_2(0) - P_{ATT}(r_2)$$

should be fulfilled. After the movement, the following relation has to be fulfilled.

$$PT_1 + PG_1(0) - \Delta PG_1 - P_{ATT}(r_1) = PT_2 + PG_2(0) - \Delta PG_2 - P_{ATT}(r_2)$$

Accordingly, the control is carried out such that the relation of the following formula (e) is fulfilled.

$$\Delta PG_1 = \Delta PG_2 \quad (e)$$

For this reason, if the beam is controlled such that the amount of power gain change is a fixed value, a sharper directivity of a narrow beam width is provided to a distant mobile terminal, and a broader directivity of a wide beam width is provided to a nearby mobile terminal as shown in FIGS. 5A and 5B. Accordingly, power is not rapidly decreased (a decrement is $\Delta PG_2$) if the nearby mobile terminal moves in a circumferential direction at a high speed v, making it possible to satisfactorily follow the nearby mobile terminal. In this case, the transmission power of the mobile terminal can be set to a fixed amount, regardless of the distance, i.e., $PT_1 = PT_2$. The directional beam depending on the distance of a mobile terminal can be obtained either by adjusting the weighting factors from the beginning supposing a specific directivity pattern, or as a result of control so as to satisfy the condition of the formula (e) above, rather than supposing a specific directivity pattern. Anyway, according to the embodiment of the present invention, control is carried out such that the condition of the formula (e) is met at every updating step of the weighting factors.

Here, the control that satisfies the condition of the formula (e) can be carried out in various ways such as that a difference between $\Delta PG_1$ and $\Delta PG_2$ is made smaller than a predetermined value D, ($\epsilon < D$ and $\epsilon = |\Delta PG1 - \Delta PG2|$), and that each of $\Delta PG_1$ and $\Delta PG_2$ is made smaller than a predetermined margin M ($\Delta PG_1 < M$, and $\Delta PG_2 < M$).

By the way, from a viewpoint of system control stability, it is desirable that updating of the weighting factors by the weight adjustment unit 228 be performed for every predetermined number of receiving samples, rather than updating every time when a sample is received. Nevertheless, the weighting factors are calculated every time when a sample is received. Here, the system control stability is equivalent to smoothness of directivity changes carried out by the weighting factors being continuously updated.

For example, whenever a weighting factor is updated (every updating period T1), the condition of the formula (e) is to be fulfilled. However, weighting factors about samples received during T1 are calculated and averaged without imposing the condition of the formula (e). Although there may be a weighting factor that does not satisfy the conditions of the formula (e), a stable weighting factor is obtained for every updating period T1 by averaging weighting factors of two or more samples during T1.

Alternatively, it is also possible to calculate a still more stable weighting factor within the updating period T1 under certain conditions. For example, it is possible to control such that an integral value S1 of the received power over a fixed period will be constant regardless of the distance. Specifically, the total received power S1 while the phase angle of a distant mobile terminal as shown in FIG. 5A changes from 0 to $\Delta\theta_1$ is expressed by $$S_1 = \sum_{\theta=0}^{\Delta\theta_1} PR_1(PT_1, PG(\theta_1), r_1)$$

This S1 is equivalent to a shaded area in FIG. 5A. Similarly, the total received power S2 while the phase angle of the mobile terminal near the radio base station changes from 0 to $\Delta\theta_2$ is expressed by $$S_2 = \sum_{\theta=0}^{\Delta\theta_2} PR_2(PT_2, PG(\theta_2), r_2)$$

This S2 is equivalent to a shaded area in FIG. 5B. Then, it is controlled such that S1=S2 within the updating period T1. In this manner, the condition of the formula (e) is satisfied for every updating period, and in addition, since the total received power becomes fixed as for the samples obtained in the updating period T1, a stable weighting factor is calculated.

Figure 6:
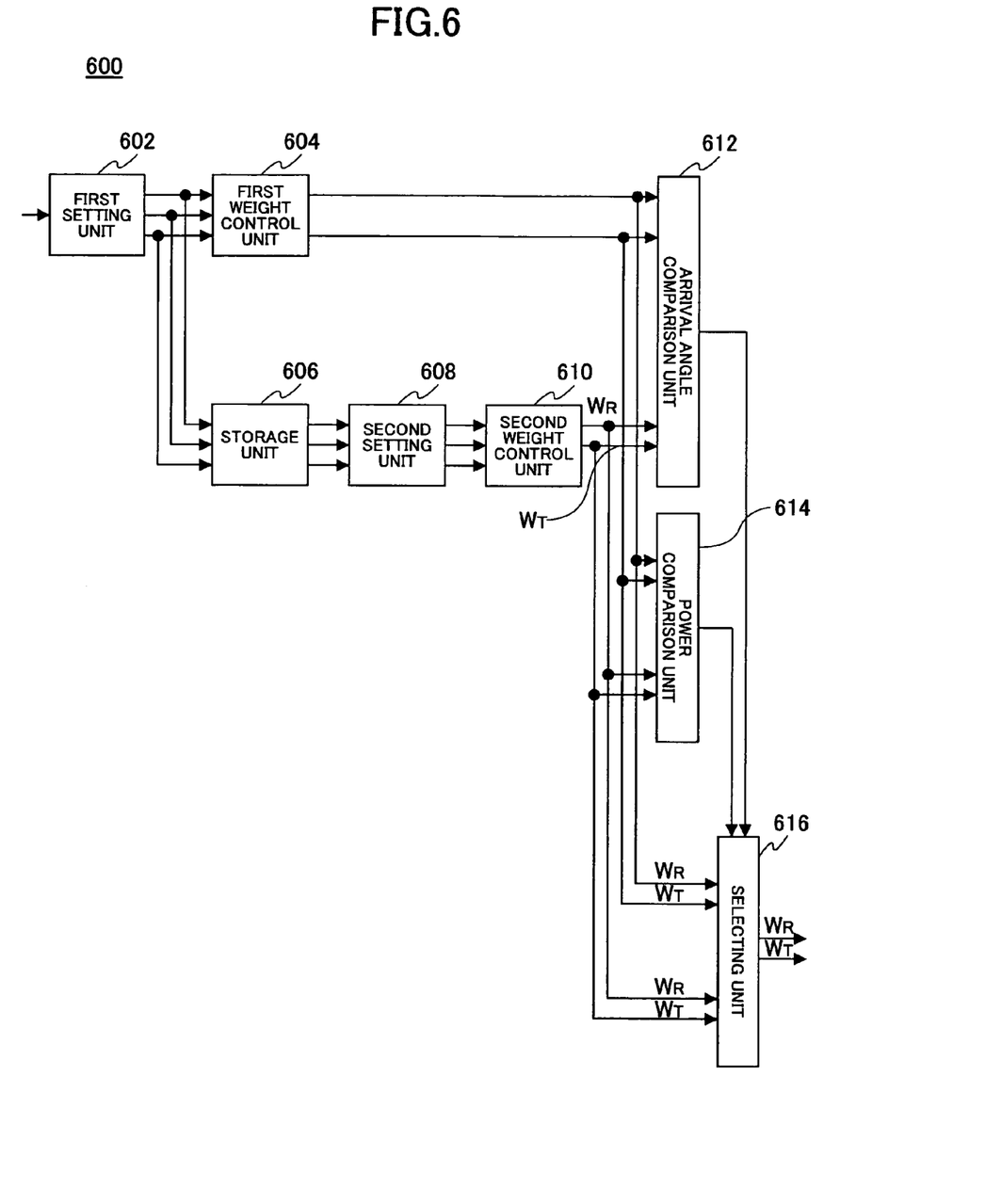
FIG. 6 is a block diagram of an adaptive control apparatus according to another embodiment of the present invention.

FIG. 6 is a block diagram of an adaptive control apparatus 600 according to another embodiment of the present invention. The adaptive control apparatus 600 includes a first setting unit 602 that sets up first parameters necessary in calculating a weighting factor based on the received signal either before adding or after adding, and a first weight control unit 604 that outputs a first weighting factor based on the first parameters. These are the same as those of the adaptive control apparatus shown by FIG. 2. Furthermore, the adaptive control apparatus 600 includes a storage unit 606 that stores parameters, such as distance r, speed v, and angular speed $\Delta\theta$ used in calculating a weighting factor. The adaptive control apparatus 600 includes a second setting unit 608 that estimates future parameters values using the past parameters stored in the storage unit 606. For example, the second estimating unit 608 estimates present parameters, such as the distance r, speed v, and angular speed $\Delta\theta$, based on two sets of past parameters, such as the distance r, speed v, and angular speed $\Delta\theta$. The kind and number of parameters that are referred to by the second setting unit 608 may be suitably changed as needed. The adaptive control apparatus 600 includes a second weight control unit 610 that outputs a second weighting factor based on the second parameters set up by the second setting unit 608. The first and the second weight control units 604 and 610 are common to the extent that they output a weighting factor; however, the parameters used as the foundation of the calculation are different.

The adaptive control apparatus 600 includes an arrival angle comparison unit 612 that determines an amount of difference between directivity (a main lobe direction) that may be realized by the first weighting factor, and directivity (a main lobe direction) that may be realized by the second weighting factor. The adaptive control apparatus 600 includes a power comparison unit 614 that determines an amount of difference of the power that may be received when the first directivity by the first weighting factor is realized, and the power that may be received when the second directivity by the second weighting factor is realized. Further, the adaptive control apparatus 600 includes a selection unit 616 that selects one of the first weighting factor and the second weighting factor based on an output from the arrival angle comparison unit 612 and/or an output from the power comparison unit 614.

As described above, both first and the second weight control units 604 and 610 output weighting factors, but parameters for calculation are different. In the case that the parameters set up by the first setting unit 602 and the second setting unit 608 are equal, the weighting factors obtained by the two weight control units 604 and 610 become equal. However, the first parameters obtained at time $t=t_n$ may be different from the second parameters estimated based on the past parameters at $t=t_{n-1}$, $t_{n-2}$, and so on. For example, when the mobile terminal is moving at high speed, change of the moving speed or the moving direction is large, and the second parameters reflect the actual condition more properly than the first parameters. In this case, it becomes difficult to fully follow the mobile terminal only with the first parameters. According to the embodiment, the arrival angle comparison unit 612 determines an amount of difference $\Delta\Theta$ between the direction of the main lobe that may be realized by the first weighting factor, and the direction of the main lobe that may be realized by the second weighting factor. When this amount of difference $\Delta\Theta$ exceeds a predetermined threshold, the arrival angle comparison unit 612 determines that the mobile terminal can no longer be followed by the first weighting factor calculated based on the first parameters. Then, the arrival angle comparison unit 612 provides an instruction signal to the selection unit 616 so that the second weighting factor, not the first weighting factor, will be output from the adaptive control apparatus 600 as the initial value of calculation of a next weighting factor. In this manner, the amount of difference $\Delta\Theta$ is made small, and it becomes possible to follow the mobile terminal that moves at high speed.

Figure 7A:
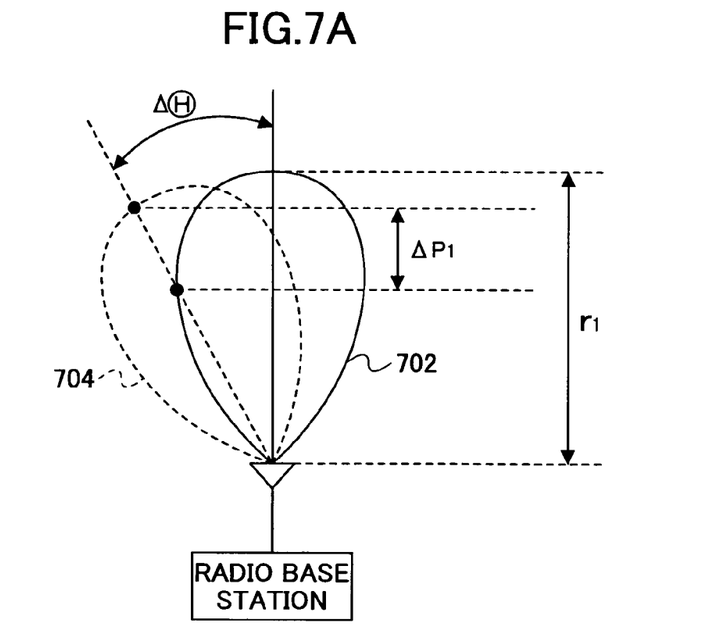
FIGS. 7A and 7B give antenna gain patterns of beams that have different directivity characteristics.
Figure 7B:
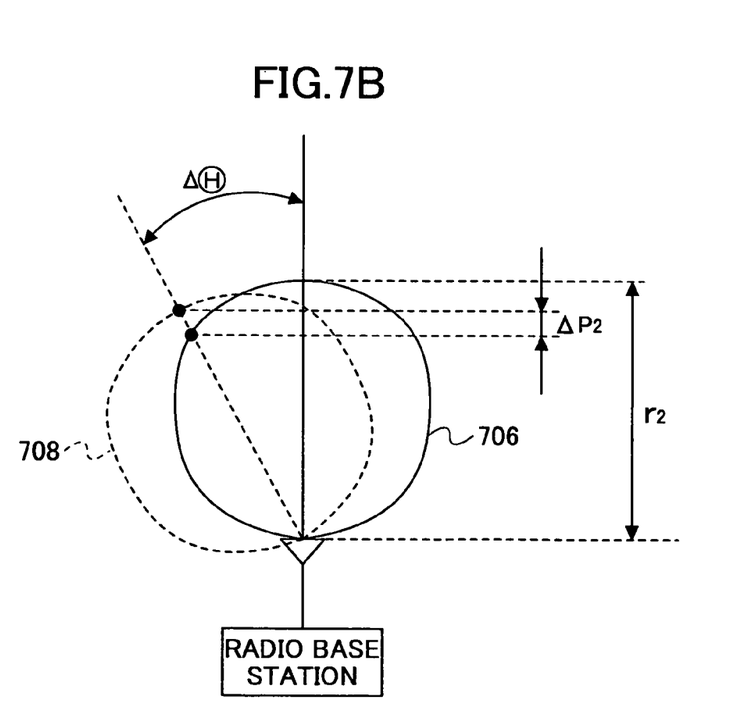

FIG. 7A, shows a first main lobe 702 and a second main lobe 704 that may be formed for a distant mobile terminal (not shown) by the radio base station. The first main lobe 702 is realized by the first parameters and the first weighting factor. The second main lobe 704 is realized by the second parameters and the second weighting factor. The amount of difference between power that the distant mobile terminal receives by the main lobes is expressed by $\Delta P_1$. Similarly FIG. 7B, shows a first main lobe 706 and a second main lobe 708 that may be formed for a nearby mobile terminal (not shown) by the radio base station. The amount of difference between the power that the nearby mobile terminal receives by the main lobes is expressed by $\Delta P_2$.

As shown in FIGS. 7A and 7B, the amount of difference of the received power between the two main lobes varies with the distance between the radio base station and the mobile terminal, and there is a relation $\Delta P_1 > \Delta P_2$. This indicates that changing directivity greatly influences the distant mobile terminal, while there is little influence on the nearby mobile terminal. That is, when the amount of differences $\Delta\Theta$ of the arrival angle becomes great, following a distant mobile terminal becomes no longer possible, while a nearby mobile terminal can be still followed, since the beam width is wide. Then, it is advantageous that the power comparison unit 614 calculates the amounts of differences of the power about the two sets of main lobes $\Delta P_1$ and $\Delta P_2$; and when the amount of differences exceeds a predetermined threshold, a direction signal is provided to the selection unit 616 such that the second weighting factor is selected.

Figure 8:
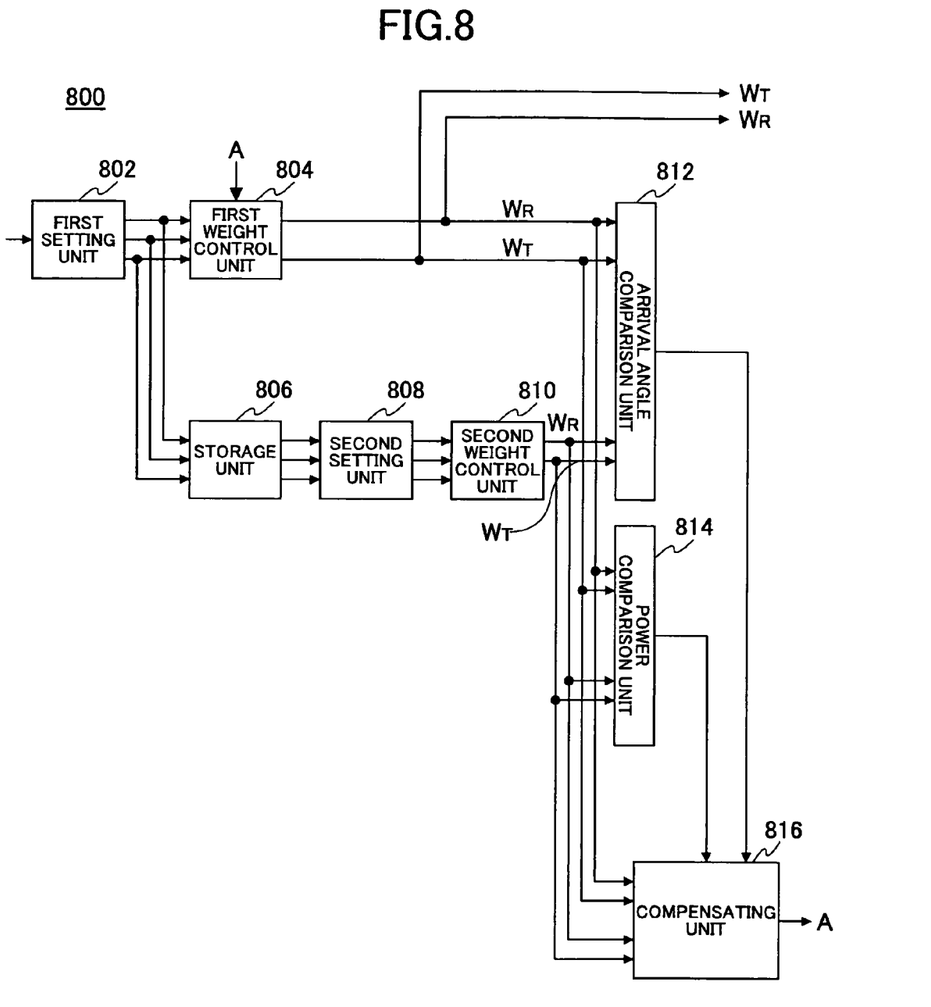
FIG. 8 is a block diagram of the adaptive control apparatus according to another embodiment of the present invention.

Although the present embodiment provides the arrival angle comparison unit 612 and the power comparison unit 614, the power comparison unit 614 can be omitted if a processing burden is desired to be less. However, if the two units are prepared, the initial value of the weight calculation can be compulsorily set up when really necessary such as when the distant mobile terminal can no longer be followed (this feature is advantageous from a viewpoint of the stability of system control, because discontinuity, such as the initial value setting, should be avoided as long as possible.) FIG. 8 is a block diagram of an adaptive control apparatus 800 according to another embodiment of the present invention. The adaptive control apparatus 800 includes a first setting unit 802 that sets up first parameters required when calculating a weighting factor based on the received signal before or after addition, and a first weight control unit 804 that outputs the first weighting factor based on the first parameters. The two units are the same as those of the adaptive control apparatus shown in FIG. 2. The adaptive control apparatus 800 includes a storage unit 806 that stores parameters such as the distance r, speed v, and angular speed $\Delta\theta$ that are used in calculating the weighting factor. The adaptive control apparatus 800 includes a second setting unit 808 that estimates future parameters (second parameters) using the past parameters stored in the storage unit 806. The adaptive control apparatus 800 includes a second weight control unit 810 that outputs a second weighting factor based on the second parameters set up by the second setting unit 808. The adaptive control apparatus 800 includes an arrival angle comparison unit 812 that determines an amount of direction difference $\Delta\Theta$ between a main lobe that may be realized by the first weighting factor, and a main lobe that may be realized by the second weighting factor. The adaptive control apparatus 800 includes a power comparison unit 814 that determines an amount of power difference $\Delta P$ between power that may be received when the first main lobe is realized by the first weighting factor, and power that may be received when the second main lobe is realized by the second weighting factor. These units are the same as the respective units explained with reference to FIG. 6.

The present embodiment provides a compensation unit 816 that outputs a compensation signal A based on the first weighting factor, the second 2 weighting factor, and an instruction signal from the arrival angle comparison unit 812 and/or the power comparison unit 814. The compensation signal A is fed back to the first weight control unit 804. The weighting factor output from the adaptive control apparatus 800 of the present embodiment is the first weighting factor output from the first weight control unit 804.

If the amount of direction difference $\Delta\Theta$ between the arrival angles calculated for the main lobes realized by the first and second weighting factors, and/or the amount of difference $\Delta P$ between received power levels exceed a predetermined value, the compensation unit 816 is notified to that effect. The compensation unit 816, in response to the notice, outputs the compensation signal A calculated based on the amount of differences between the first and second weighting factors. The contents of the compensation signal A are to correct the contents of the next calculation of the first parameters, and not to compulsorily set the second weighting factor as the initial value of the next calculation of the weighting factor; for example, the compensation signal A can be arranged such that an offset amount is added to each parameter or weighting factor. Note that if the initial value is compulsorily changed, causing discontinuity, there is a risk that the beam will be pointed away from the mobile terminal. Accordingly, the present embodiment provides the feedback signal, such as the compensation signal A, such that the weighting factor is smoothly updated for the mobile terminal that moves at high speed.

Figure 9:
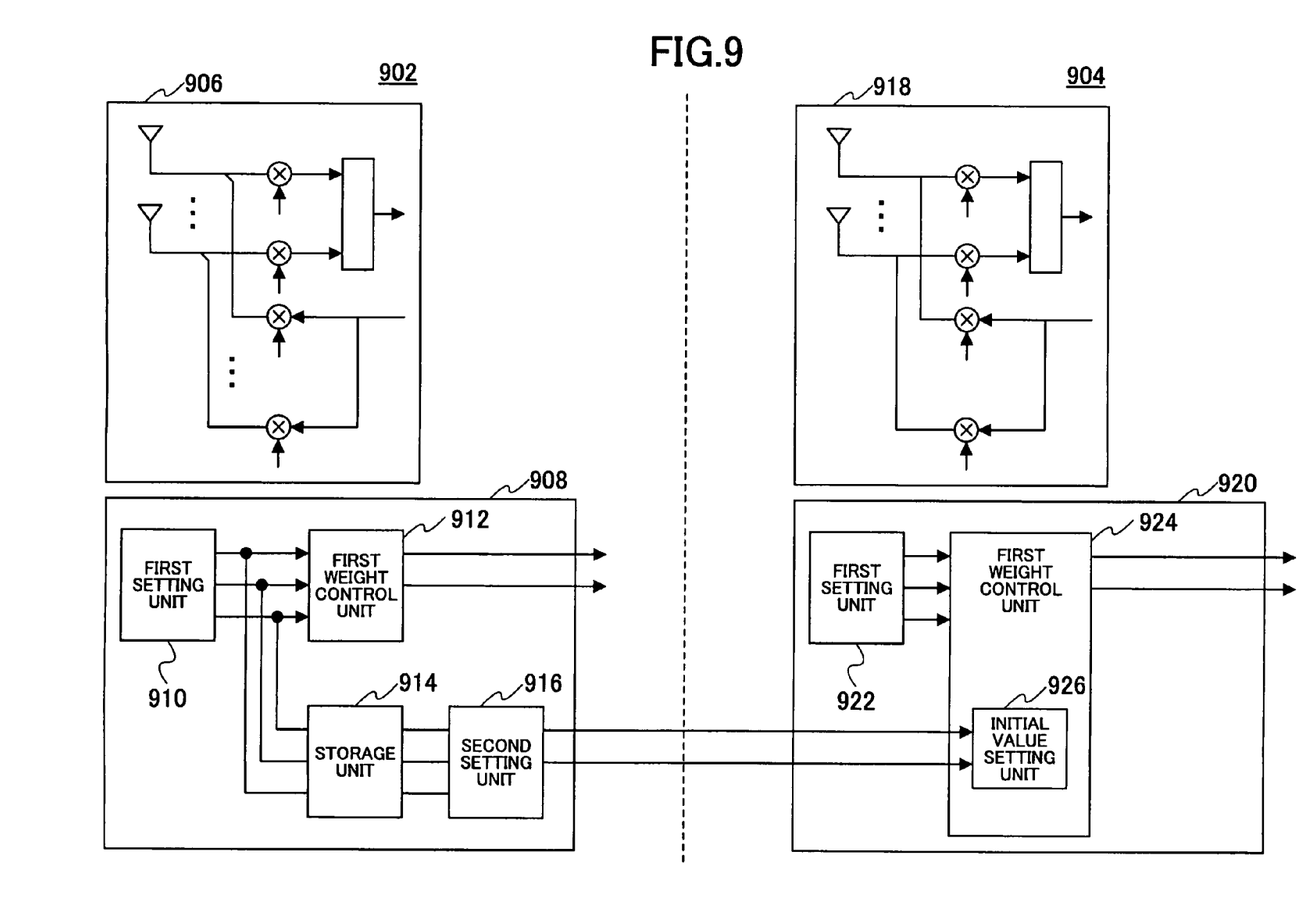
FIG. 9 is a block diagram of a radio base station that uses the adaptive control apparatus according to the embodiment of the present invention.

FIG. 9 is a block diagram of radio base stations 902 and 904 that employ the adaptive control apparatus according to the embodiments of the present invention. The first radio base station 902 includes a first array antenna 906 and a first adaptive control apparatus 908. The first adaptive control apparatus 908 includes a first setting unit 910 that sets up first parameters required to calculate a weighting factor based on the received signal before and after addition, and a first weight control unit 912 that outputs a first weighting factor based on the first parameters. The first adaptive control apparatus 908 includes a storage unit 914 that stores parameters such as the distance r, speed v, and angular speed Δθ used in calculating the weighting factor. The first adaptive control apparatus 908 includes a second setting unit 916 that estimates future parameters based on the past parameters stored in the storage unit 914. These elements are the same as those shown in FIG. 6.

The second radio base station 904 includes a second array antenna 918 and a second adaptive control apparatus 920, like the first radio base station 902. The second adaptive control apparatus 920 includes a first setting unit 922 that sets first parameters required when calculating a weighting factor based on the received signal before and after addition, and a first weight control unit 924 that outputs a first weighting factor based on the first parameters. The first weight control unit 924 includes an initial value setting unit 926. Although the second adaptive control apparatus 920 includes the same elements as the first adaptive control apparatus 908, illustration of other units is omitted for simplicity purposes.

Suppose that a mobile terminal is served by the cell of the first radio base station 902, and communicates using the directive beam controlled by the adaptive control of the first radio base station 902. Further, suppose that the mobile terminal arrives at the edge of the cell, and then enters the cell of the second radio base station 904, while keeping communication. At the hand over, the first adaptive control apparatus 908 provides the parameters about the mobile terminal to the destination radio base station 904. Specifically, the parameters are provided to the initializing unit 926. Generally, the parameters provided include the distance r, speed v, and angular speed Δθ; however, if the distance r is already known, for example, in the case of hand over, it can be omitted. By providing the parameters at the hand over in this manner, the initial "drawing-in" time of the beam formation is shortened, and the destination radio base station 904 can promptly set up suitable directivity of the beam. Here, although the present embodiment provides the parameters that are estimated based on the past parameters at the hand over, it is also possible to provide current parameters in replace of or in addition to the past parameters.

Further, the present invention is not limited to these embodiments, but variations and modifications may be made without departing from the scope of the present invention.

What is claimed is:

1. An adaptive control apparatus used by a radio apparatus having an array antenna for transmitting and receiving a radio frequency signal, the adaptive control apparatus adjusting directivity of the array antenna, comprising:
    a setting unit configured to set up parameters including a distance between the radio apparatus and a receiver that receives the radio frequency signal transmitted by the radio apparatus, a relative moving speed, and a moving direction of the receiver with reference to the radio apparatus;
    an evaluating unit configured to evaluate how much received power at one of the receiver and the radio apparatus changes after a predetermined period; and
    a weight control unit configured to adjust a plurality of weighting factors of a plurality of antenna elements contained in the array antenna;
    wherein the directivity is adjusted such that the amount of change of the received power is kept within fixed limits independent of the distance between the receiver and the radio apparatus and the setting unit further comprises:
        a first setting unit configured to set up first parameters including the distance between the radio apparatus and the receiver that receives the radio frequency signal transmitted from the radio apparatus, the relative moving speed, and the moving direction of the receiver with reference to the radio apparatus based on the signal received by the array antenna;
        a storage unit configured to store the parameters used in order to determine the weighting factor that is continuously updated, the storage unit being connected to an output of the first setting unit;
        a second setting unit configured to output second parameters that serve as estimated present parameters by using the parameters stored in the storage unit, and wherein the weight control unit:
        calculates the first weighting factor based on the first parameters and the second weighting factor based on the second parameters, and
        calculates a next weighting factor by setting the second weighting factor as an initial value, if an amount of difference between a direction of a first directivity, that may be realized b the first weighting factor, and a direction of a second directivity, that may be realized b the second weighting factor, is greater than a predetermined value.

2. The adaptive control apparatus as claimed in claim 1, further comprising:
    an integral value calculating unit configured to calculate an integral value of the received power over a predetermined period;
    wherein the directivity is adjusted such that the integral value is kept within fixed limits independent of the distance between the receiver and the radio apparatus.

3. The adaptive control apparatus as claimed in claim 1, wherein the setting unit comprises:
    a distance calculating unit configured to calculate the distance using a known relation between a magnitude of power received by the array antenna and a magnitude of propagation attenuation.

4. The adaptive control apparatus as claimed in claim 3, wherein the distance calculating unit is configured to calculate the distance based on a magnitude of power received by one antenna element.

5. The adaptive control apparatus as claimed in claim 3, wherein the distance calculating unit is configured to calculate the distance based on magnitudes of power received by a plurality of antenna elements.

6. The adaptive control apparatus as claimed in claim 1, wherein the setting unit further comprises:
    a Fourier transform unit configured to obtain a frequency spectrum of the signal that is received by the array antenna; and
    a speed calculating unit configured to obtain the relative speed by detecting a Doppler frequency shift based on the frequency spectrum.

7. The adaptive control apparatus as claimed in claim 6, wherein the Fourier transform unit of the setting unit is configured to obtain the frequency spectrum based on a signal received by one antenna element.

8. The adaptive control apparatus as claimed in claim 6, wherein the Fourier transform unit of the setting unit is configured to obtain the frequency spectrum based on signals received by a plurality of antenna elements.

9. The adaptive control apparatus as claimed in claim 1, wherein the weight control unit calculates the next weighting factor by setting the second weighting factor as the initial value, if an amount of difference between power that the receiver can receive when the directivity of the array antenna is the first directivity, and power that the receiver can receive when the directivity of the array antenna is the second directivity is greater than a predetermined value.

10. The adaptive control apparatus as claimed in claim 1, wherein the receiver is a mobile terminal used in a cellular communication system, and the radio apparatus is a radio base station prepared for a cell.

11. The adaptive control apparatus as claimed in claim 10, wherein the parameters about the mobile terminal are handed over when the mobile terminal is handed over to another cell.

12. An adaptive control apparatus used by a radio apparatus having an array antenna for transmitting and receiving a radio frequency signal, the adaptive control apparatus adjusting directivity of the array antenna and comprising:
  a first setting unit configured to set up first parameters including the distance between the radio apparatus and the receiver that receives the radio frequency signal transmitted from the radio apparatus, the relative moving speed, and the moving direction of the receiver in reference to the radio apparatus based on the received signal from the array antenna;
  a storage unit configured to store the first parameters used in order to determine the weighting factor that is continuously updated, the storage unit being connected to the output of the first setting unit; and
  a second setting unit configured to estimate present parameters serving as second parameters based on the first parameters stored in the storage unit, and to output the second parameters, and the weight control unit further comprises:
    a compensating unit configured to calculate the first weighting factor based on the first parameters and the second weighting factor based on the second parameters, and to feed back information of the second weighting factor to the first selling unit such that the first parameters are compensated for when an amount of difference between the direction of the first directivity, that may be realized by the first weighting factor, and the direction of the second directivity, that may be realized by the second weighting factor, is greater than a predetermined value.

13. The adaptive control apparatus as claimed in claim 12, wherein the compensating unit feeds back the information about the second weighting factor to the first selling unit such that the first parameters are compensated for when an amount of difference between power that the receiver can receive with the first directivity of the array antenna and power that the receiver can receive with the second directivity of the array antenna is greater than a predetermined value.

* * * * *

UNITED STATES PATENT AND TRADEMARK OFFICE
CERTIFICATE OF CORRECTION

PATENT NO. : 7,395,030 B2  Page 1 of 1
APPLICATION NO. : 11/051642
DATED : July 1, 2008
INVENTOR(S) : Makoto Yoshida et al.

It is certified that error appears in the above-identified patent and that said Letters Patent is hereby corrected as shown below:

Column 12, Line 29, after "realized" change "b" to --by--.

Column 12, Line 31, change "b" to --by--.

Column 14, Line 14, change "selling" to --setting--.

Column 14, Line 23, change "selling" to --setting--.

Signed and Sealed this

Twenty-fifth Day of November, 2008

JON W. DUDAS
*Director of the United States Patent and Trademark Office*